Feb. 10, 1970     A. N. COOK ET AL     3,495,082
SWITCHING MODULE FOR COMBINED MOTOR AND LAMP CONTROL
CIRCUITS FOR SEWING MACHINES
Filed Jan. 2, 1968

Witness

Rosalind Tsai

*INVENTOR.*
Albert N. Cook And
Alan H. Stolpen
BY
Marshall J. Breen
ATTORNEY

United States Patent Office 3,495,082
Patented Feb. 10, 1970

3,495,082
SWITCHING MODULE FOR COMBINED MOTOR AND LAMP CONTROL CIRCUITS FOR SEWING MACHINES
Albert N. Cook, Madison, and Alan H. Stolpen, Union, N.J., assignors to The Singer Company, New York, N.Y., a corporation of New Jersey
Filed Jan. 2, 1968, Ser. No. 695,010
Int. Cl. D05b 79/00
U.S. Cl. 240—2.14
2 Claims

ABSTRACT OF THE DISCLOSURE

A single switching module having three operator-actuated positions corresponding to off, high speed range and low speed range provides means for placing a half-wave rectifier selectively in series circuit relation with the motor and controller when the switch is in its low speed position. When the switch is in its off position, both the motor and the lamp are off even when the motor controller is actuated. When the switch is in its high speed position, the lamp will light and when the motor controller is actuated the motor will operate over a high speed range. When the switch is in its low speed position, the lamp will light and when the motor controller is actuated the motor will operate over a relatively substantially lower speed range for the same controller actuation used in the high speed position of the switch.

BACKGROUND OF THE INVENTION

In modern high speed sewing machines, it is advantageous to, at will, be able to operate the motor controller over a lower than normal speed range. It is even more advantageous to have readily selectable by the operator a range of low speeds and a range of high speeds, said ranges corresponding to the same full travel of the controller. It is further desirable to incorporate the selection of motor speed range in the same device as used for controlling the on and off condition of both the motor and lamp of a sewing machine, and insofar as we are aware, this has not heretofore been accomplished. Prior art devices for providing selected speed ranges in sewing machines have generally employed a multiplicity of elements involving internal modifications to either the motor or the controller and greatly complicating their assembly and adding to their cost.

SUMMARY OF THE INVENTION

It is therefore a primary object of the invention to provide a sewing machine motor and lamp control circuit which provides single means for selecting a high speed range and a low speed range for the motor for the same speed controller movement, which single means also provides a simultaneously selected off position for both motor and lamp.

Another object of the invention is to provide a sewing machine motor and lamp control circuit in accordance with the foregoing object without adding significantly to the cost of the sewing machine.

Other objects and a fuller understanding of the invention can be had by referring to the description and claims taken in conjunction with the accompanying drawings.

DESCRIPTION OF THE PREFERRED EMBODIMENT

Figure 1:
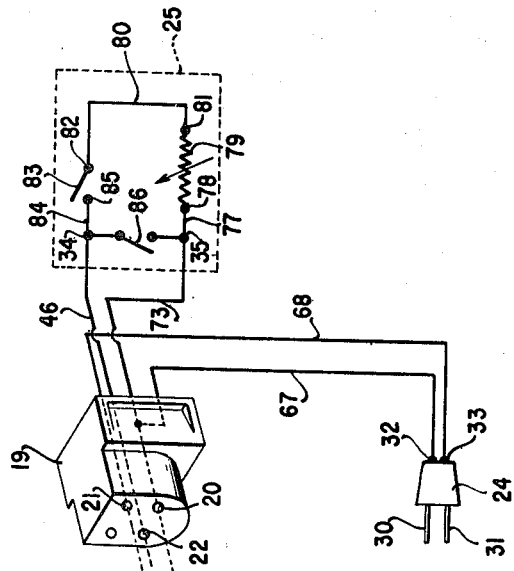
FIG. 1 is a schematic view of a sewing machine motor and lamp control circuit including a switching module embodying the invention.
Figure 1:
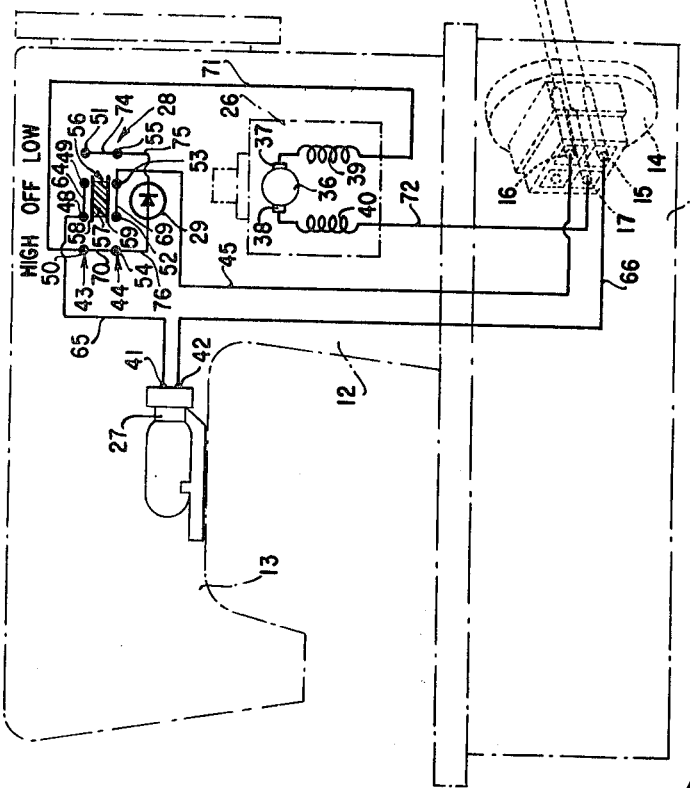

With reference to FIG. 1 of the drawings, a sewing machine motor and lamp control circuit including the switching module of the invention is shown embodied in a sewing machine having a frame including a work supporting bed 11, a hollow standard 12 rising from one end of the bed, and a bracket arm 13 at the top of the standard overhanging the bed. A receptacle 14 having first, second, and third prongs 15, 16 and 17 is mounted in the standard-end of the bed to receive a mating dettachable plug 19 having first, second and third contacts 20, 21 and 22 corresponding to the first, second, and third prongs of the receptacle 14.

The sewing machine motor and lamp control circuit of the invention includes the following elements: a plug 24 for connecting to a conventional source of alternating current which is not shown, a motor speed controller in the form of a conventional foot controller 25, a conventional series commutator motor 26 mounted in the hollow standard, a lamp 27 of the type disclosed in a United States patent of Cook et al., No. 3,176,121, granted Mar. 30, 1965, mounted in the bracket arm, a slide-type double-pole, double-throw switch 28, mounted in the top of the standard, and a half-wave rectifier in the form of a diode 29 also mounted in the top of the standard.

The plug 24 has first and second prongs 30 and 31 and first and second terminals 32 and 33 corresponding to the first and second prongs. The foot controller has first and second terminals 34 and 35. The motor has an armature 36, first and second brushes 37 and 38, and first and second field windings 39 an 40 corresponding to the first and second brushes. The lamp has first and second terminals 41 and 42. The double pole, double throw switch 28 has first and second stationary poles 43 and 44 and off, high speed and low speed positions. The first pole 43 of the switch has center contacts 48 and 49, one contact 50 corresponding to the high speed position, and one contact 51 corresponding to the low speed position. The second stationary pole 44 of the switch 28 has center contacts 52 and 53, one contact 54, corresponding to the high speed position, and one contact 55 corresponding to the low speed position. A sliding member 56 is sandwiched between the first and second poles of the switch. The sliding member has an insulator 57 sandwiched between first and second conducting contacts 58 and 59 corresponding to the first and second poles of the switch.

The elements of the motor and lamp control circuit of the invention are electrically interconnected in the following manner. A lead 64 is connected between the center contacts 48 and 49 and a lead 65 is connected between contact 48 and the first terminal 41 of the lamp.

A lead 66 is connected between the second terminal 42 of the lamp thence through the receptacle 14 and plug 19 and by way of a lead 67 to the first terminal 32 of the plug 24. A lead 68 is connected between the second terminal 33 of the plug 24 thence through the plug 19 and receptacle 14, and by way of lead 45 to the contact 53 of the switch. A lead 69 is connected between the center contacts 52 and 53 of the switch.

A lead 70 is connected between the contacts 50 and 54 and a lead 71 is connected between the contact 50 and the first field winding 39 of the motor. A lead 72 is connected between the second field winding 40 of the motor, thence through receptacle 14 and plug 19 and by way of lead 46 to the first terminal 34 of the foot controller 25. A lead 73 is connected between the second terminal 35 of the foot controller and thence by way of lead 67 to the first terminal of the plug 24.

A lead 74 is connected between the contacts 51 and 55 of the switch 28. A lead 75 is connected between the contact 55 of the switch 28 and one end of the diode 29. And a lead 76 is connected between the opposite end of the diode 29 and the contact 54 of the switch 28.

The foot controller 25, in addition to the first and second terminals 34 and 35, includes a lead 77 between the second terminal of the foot controller and a first terminal 78 of a variable resistor 79, a lead 80 between a second terminal 81 of the variable resistor and a first contact 82 of a switch 83, and a lead 84 between a second contact 85 of the switch and the first terminal 34 of the foot controller. A second switch 86 is connected between the first and second terminals of the foot controller.

In operation, assuming that the plug 24 is connected to the source of alternating current (not shown), when the sliding member 56 of the switch is in the center or off position as shown, the lamp 77 cannot light because the insulator 57 of the sliding member of the switch creates an open circuit in the circuit loop represented by the leads 64, 65, 66, 67, 68, 45 and 69. In addition, even when the foot controller is actuated to close the switch 83 inside the foot controller, the motor cannot run because the position of the sliding member of the switch 28 also creates an open circuit in the loop represented by the leads 70, 71, 72, 46, 73, 67, 68, 45 and 69.

However, when the sliding member 56 of the switch 28 is in the high speed position, the lamp will light because contacts 58 and 59 of the sliding member bridge the gaps respectively between the contacts 48 and 50 and the contacts 52 and 54. The contacts 58 and 59 of the sliding member of the switch and the lead 70 close the circuit in the loop represented by the leads 65, 66, 67, 68, 45 and 69 so that the lamp 27 is connected to the voltage source and will be energized. In addition, the second contact 59 of the sliding member of the switch closes the circuit in the loop represented by the leads 70, 71, 72, 46, 73, 67, 68, 45 and 69 so that the motor will be connected to be energized by the voltage source when the foot controller is actuated to close the switch 83 inside the foot controller.

When the sliding member of the switch is in the low speed position, the lamp will light because the first and second contacts 58 and 59 of the sliding member bridge the gaps respectively between the contacts 49 and 51 and the contacts 53 and 55. The contacts 58 and 59 of the sliding member and the lead 74 close the circuit in the loop represented by the leads 64, 65, 66, 67, 68 and 45, so that the lamp is connected to the voltage source and will be energized. In addition, the second contact 59 of the sliding member of the switch and the two leads 75 and 76, including the diode 29, close the circuit in the leep represented by the leads 70, 71, 72, 46, 73, 67, 68 and 45, placing the diode in series with the motor and the voltage source so that the motor will run when the foot controller is actuated to close the switch 83 inside the motor controller.

Figure 2:
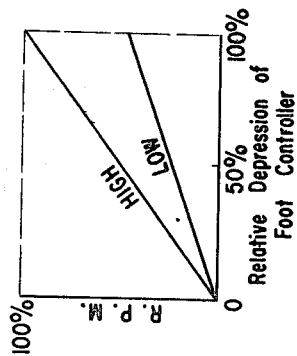
FIG. 2 is a graph showing both the high speed range and the low speed range characteristics of the motor for the entire range of depression of the same foot controller obtained by using the switching module of this invention.

When the sliding member 56 of the switch 28 is in its high speed position, the motor may receive the full A.C. voltage of the source to produce a range of high speeds from 0 to 100 percent represented by the curve marked "high" in FIG. 2 as the foot controller is depressed to successively decrease the resistance of the variable resistor 79. When the foot controller is completely depressed, the second switch 86 inside the foot controller is also closed to ideally provide zero resistance and hence maximum speed.

When the sliding member 56 of the switch 28 is in its low speed position, the diode 29 is inserted as a series element in the circuit supplying current to the motor. The diode 29 permits only the half waves of one polarity of the A.C. voltage source to be effective in producing motor power and the result is as though the effective value of the source voltage were decreased to substantially half the value available in the high speed position of member 56.

This result is shown graphically in FIG. 2 wherein the curve marked "high" and the curve marked "low" show the motor speed response as a function of the relative depression of the foot controller for respectively the high and the low position of the sliding member 56 of the switch 28. It is obvious from the relative slopes of the curves that, in the low speed position of the switch 28, the speed range for a given controller depression is substantially less than in the high speed position which means that low speeds can be controlled with substantially greater facility in this low speed position of the switch 28.

It should be noted especially that in accordance with this invention, the switch 28 and diode 29 can, with facility, be handled in assembly as a single circuit module requiring only three output leads 45, 65, and 71 for external connection, the diode 29 being connected to the switch 28 as a subassembly along with the bridging leads 64, 69, 70 and 74 which latter may be made internally of the module itself.

Thus the sewing machine combined motor and lamp control circuit of this invention provides, by means of a single uniquely connected switching module of small size and cost comprising a conventional three-position switch and a diode, simple means for, at will, selecting either one of two speed ranges for the motor and an off condition for both motor and lamp. It is manifest that the installed cost of such a module is negligible in comparison with the improved results obtained and this is of substantial practical importance where a highly-competitive mass-manufactured product such as a sewing machine is concerned.

Although the invention has been described in its preferred form with a certain degree of particularity, it is understood that the present disclosure of the preferred form has been made by way of example and that numerous changes in the details of construction and the combination and arrangement of parts can be resorted to without departing from the spirit and the scope of the invention.

Having thus set forth the nature of this invention, what is claimed herein is:

1. In a sewing machine having an electric motor drivingly connected thereto, a lamp for illuminating a portion thereof and an operator-influenced speed controller connected to said motor and to a source of A.C. voltage for controlling the motor speed, a single switching module comprising a diode and a switch electrically connected to the diode to form a compact three-terminal device mounted on the sewing machine, said switch having an actuator accessible to the operator and selectively movable to a first position in which both the motor and the lamp are disconnected from the A.C. voltage, to a second position in which the lamp is connected directly to the A.C. voltage and in which position the motor, in series circuit relation with the controller, is connected directly to the A.C. voltage to provide a first range of motor speeds responsively to the actuation of the controller, and to a third position in which the lamp is connected directly to the A.C. voltage and in which position the motor, in series circuit relation with the controller, is connected in series with the diode and with the A.C. voltage to provide a second range of motor speeds responsively to the actuation of the controller, said second range of motor speeds being substantially less than said first range for the same controller actuation.

2. The switching module in accordance with claim 1 in which the diode is electrically connected permanently to the switch and only three separate terminals are required for operative electrical connection to the lamp, the motor and the A.C. voltage.

References Cited

UNITED STATES PATENTS

| | | | |
|---|---|---|---|
| 2,174,297 | 9/1939 | Way | 240—2.14 X |
| 3,286,150 | 11/1966 | Wilson et al. | 318—305 X |

NORTON ANSHER, Primary Examiner

ROBERT W. ADAMS, Assistant Examiner